United States Patent [19]

Hayashi et al.

[11] 4,139,511
[45] Feb. 13, 1979

[54] ASPHALT COMPOSITIONS

[75] Inventors: Shigeyuki Hayashi, Kawasaki; Masao Isobe, Kamakura; Tadakazu Yamashita, Yokohama, all of Japan

[73] Assignee: Nippon Oil Company, Ltd., Tokyo, Japan

[21] Appl. No.: 851,133

[22] Filed: Nov. 14, 1977

[30] Foreign Application Priority Data

Nov. 19, 1976 [JP] Japan ................................ 51/138405

[51] Int. Cl.$^2$ .............................................. C08L 91/00
[52] U.S. Cl. ............................ 260/28.5 AS; 260/28 P
[58] Field of Search ....................... 260/28.5 AS, 28 P

[56] References Cited

U.S. PATENT DOCUMENTS 3,678,131   7/1972   Klapprott et al. ........... 260/28.5 AS Primary Examiner—Melvyn I. Marquis
Attorney, Agent, or Firm—Bucknam and Archer

[57] ABSTRACT

An asphalt composition comprising an epoxy resin, a maleinated asphaltic material and, if desired, a curing agent for the epoxy resin.

6 Claims, No Drawings

ASPHALT COMPOSITIONS

This invention relates to a novel asphalt composition and more particularly to an asphalt composition characterized in that it contains an epoxy resin, a maleinated asphaltic material or its esters, and a necessary amount of a curing agent for epoxy resins.

Because of a high demand for a better quality material for pavement of roads, airfields and others there have so far been made various attempts to produce such materials. As examples of such products, there have been known a mixture of an epoxy resin and coal tar and a mixture of an epoxy resin and asphalt. But the former mixture has the defects that its aging resistance after curing is not sufficient and that it becomes brittle in cold weather because of the comparatively high temperature at which it becomes brittle. Besides, it is known that its component coal tar contains a large amount of a carcinogenic substance benzo(a)pyrene. The latter mixture, on the other hand, has the defects that the epoxy resin and the asphalt tend to separate from each other due to their poor compatibility with each other and that the curing of the mixture is difficult to effect even with the addition of a curing agent to it and in some cases only the resin is cured without forming the cured composition of uniform quality.

There have also been known a process for modifying asphalt with maleic anhydride or the like and a process for modifying a mixture of asphalt and rubber with maleic anhydride or the like. The products obtained by these known processes have insufficient hardness and they will exhibit undesirable phenomena such as rutting if they are used in road pavement.

An object of this invention is to provide a uniform and satisfactorily hard asphalt composition containing little or no carcinogenic substance, which is produced not using coal tar or the like but using a reformed asphaltic material excellently compatible with epoxy resins.

The asphalt composition of this invention is characterized in that it comprises (A) 100 parts by weight of an epoxy resin, (B) 10–1,000 parts by weight of maleinated asphaltic material or an ester of a maleinated asphaltic material, and, if desired, (C) a curing agent for epoxy resins.

Japanese Patent Gazette No. 3288/63 discloses a process for reacting an adduct of maleic anhydride to asphalt with a polyhydric alcohol to produce a polyester and then reacting the hydroxyl groups in the thus produced polyester with a fatty acid or abietic acid for esterification. In contrast, the maleinated asphaltic material according to the present invention is not esterified with a fatty acid or abietic acid in the practice of the present invention. Japanese Patent Application Laying-Open Gazette No. 157415/75 discloses a composition comprising bitumen (modified bitumen) containing carboxylic and/or acid anhydride groups and/or groups derived from the carboxylic and/or acid anhydride groups; a polymer or copolymer (1) containing said groups (a); and/or a polymer or copolymer (2) containing at least two functional groups (b) other than the groups (a). The Laying-Open Gazette discloses a reaction product of bitumen and maleic anhydride, as an example of the modified bitumen. However, it describes styrene-butadiene rubber derivatives as examples of the polymer or copolymer (1) and also describes dihydroxypolybutadienes as examples of the polymer or copolymer (2). Thus, the polymers or copolymers (1) and (2) according to the Laying-Open Gazette are rubber-like polymers or copolymers and do not include epoxy resins as used in the present invention.

In addition, Japanese Patent Gazette No. 8468/63 discloses a composition comprising an epoxy resin, primary polyamine and asphaltic material; Japanese Patent Gazette No. 9270/64 discloses a composition comprising coal-tar pitch, a glycidyl ether ester and a curing agent; Japanese Patent Gazette No. 30459/70 discloses a reaction product of swollen coal and maleic anhydride; Japanese Patent Gazette No. 21115/71 discloses an adhesive comprising an epoxy resin, cut-back asphalt, coal tar, a curing agent and an inorganic filler; and Japanese Patent Gazette No. 22930/76 discloses a composition comprising an epoxy resin, asphalt, tar, coal powder and a curing agent. However, the compositions disclosed by these Patent Gazettes are different in constitution from the asphalt composition of the present invention.

The maleinated asphaltic material to be used may preferably be the reaction product of an asphaltic material and maleic anhydride, and the ester of the maleinated asphaltic material may preferably be an ester resulting from the reaction of an alcohol with the reaction product of an asphaltic material and maleic anhydride.

The epoxy resins usable in this invention are commonly used ones and, in particular, compounds having a molecular weight ranging from 340 to 7,000 and at least one epoxy group

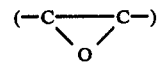

in the molecule.

Such epoxy resins include glycidyl ether type resins, glycidyl ester type resins, glycidyl amine type resins, linear aliphatic epoxy resins and alicyclic epoxy resins. These resins are described in Gekkan Kobunshi Kako Bessatsu 9 "Epokishi Jushi (Annex 9)" "Epoxy resin" to "Working of High Molecular Weight Material" published in June, 1973. Glycidyl ether type resins, glycidyl ester type resins and glycidyl amine type resins may be prepared by reacting the corresponding polyhydric alcohol(s), polybasic acid(s) and polyamine(s) with epichlorohydrin and then de-hydrochlorinating the reaction products.

Also usable are derivatives of these epoxy resins or their mixtures. The most preferable epoxy resins for use in this invention is glycidyl ether type resins, particularly glycidyl ether of bisphenol A.

The maleinated asphaltic material to be used in this invention may be prepared, for instance, by reacting maleic anhydride with asphaltic material.

The asphaltic material mentioned here means asphalt or petroleum tar which is generally known for road paving application. This is to say, the word "asphalt" means natural asphalt or petroleum asphalt. The natural asphalt includes, for example, asphaltite such as gilsonite, grahamite and glance pitch; lake asphalt such as trinidad asphalt; and rock asphalt. The petroleum asphalt that may be used includes straight asphalt obtained by distillation of a crude oil, blown asphalt produced by blowing an oxygen-containing gas into straight asphalt in the presence or absence of a catalyst, solvent-extracted asphalt yielded when the asphaltic material is separated from the petroleum fraction containing it by the use of propane or other solvents, and cutback asphalt which is a mixture of straight asphalt and a light petroleum. The petroleum tar that may be used includes oil gas tar obtained as a by-product when gases are produced from petroleum fractions, such tar in refined form, cutback tar obtained by incorporating a light petroleum fraction into such tar, and a tar pitch which is obtained as the residue by removing the volatile fraction from such tar. Any of these kinds of asphalt may be used singly or jointly. The asphaltic material that may preferably be used in this invention is asphalt. This is because coal tar is generally more sensitive to a change of temperature than asphalt and also because the amount of benzo(a)pyrene contained in asphalt is much smaller than that in coal tar. The most preferable asphaltic material in this invention is straight asphalt, particularly that having a penetration of 20–300 and a softening point of not higher than 90° C.

In this invention, in order to prepare the maleinated asphaltic material the said starting asphaltic material and maleic anhydride may be reacted together at a temperature between 100° and 300° C., preferably between 130° and 260° C. and at a pressure of at least atmospheric pressure, preferably between atmospheric pressure and 30 kg/cm$^2$. There is no particular need for a solvent or a catalyst but they may be used if necessary. The blending ratio of the asphaltic material to maleic anhydride may be selected as desired according to the kind of the asphaltic material used and the intended use of the resulting composition. The preferable blending ratio is in the range of from 100 parts by weight of the former to 0.2–100 parts by weight, more preferably 0.5–20 parts by weight, of the latter.

The reaction product obtained by reacting the asphaltic material with maleic anhydride in the above-mentioned weight ratio may contain the unreacted maleic anhydride or decomposition products of maleic anhydride. These components so contained may be previously removed from, or left in, the reaction product when it is used. The said reaction product may be used singly as a binder or may be used jointly with one or more of the above-mentioned kinds of asphaltic material.

In this invention, in order to prevent the reaction between the epoxy resin and the maleinated asphaltic material in the presence of a curing agent from taking place faster than is necessary for a particular purpose of using the composition containing these reactants, the maleinated asphaltic material may be partly or wholly replaced by its ester. Thus, it is possible to control the reaction velocity. The esters of maleinated asphaltic material to be used in this invention may be prepared, for instance, by reacting the said starting asphaltic material with an ester obtained by the reaction of maleic anhydride and an alcohol, or by reacting an alcohol with the reaction product of the said starting asphaltic material and maleic anhydride. Any alcohol may be used, but those having 1–10 carbon atoms may advantageously be used. Preferable alcohols are methanol, ethanol, isopropyl alcohol, glycol, glycerine, benzyl alcohol and cyclohexyl alcohol, with monohydric alcohols being particularly preferred. These reactions may take place at ambient temperature or up to 230° C., preferably at ambient temperature or up to 200° C., and at atmospheric pressure or up to 30 kg/cm$^2$, preferably at atmospheric pressure or up to 20 kg/cm$^2$.

In this invention the weight ratio of the epoxy resin and the maleinated asphaltic material or its ester used may preferably be in the range of from 100 parts by weight of the former to 10–2,000 parts by weight, most preferably 20–1,000 parts by weight, of the latter. If the quantity of the latter is less than 10 parts by weight, the resulting cured composition will be insufficient in flexibility and other properties, and if it is more than 2,000 parts by weight, the effect of the epoxy resin contained in the composition in this case will be unsatisfactory. The mixing of the two components may be performed at a temperature between 0°–200° C., preferably between 10°–160° C., and for a period of from 5 seconds to 3 hours, preferably from 10 seconds to 10 minutes. If the mixing temperature is lower than 0° C. or if the mixing time is less than 5 seconds, the mixing of the epoxy resin and maleinated asphaltic material is insufficient and hardness (penetration) of the resulting composition is not uniform at every part thereof. More particularly, if the composition is prepared under the above-mentioned preferable conditions, the product will be a uniform composition of the epoxy resin and reformed asphaltic material, which product is not a mere mixture of the two but a chemically bonded, epoxy-modified asphaltic material.

If desired, the composition, after mixing, may be allowed to stand still for ageing. In this case there are no specific limitations on the conditions under which the ageing is effected. However, the ageing may be effected at temperatures of 0°–200° C., preferably 10°–160° C., for a period of 10 minutes to 6 months, preferably 10 minutes to 2 months.

In this invention, not more than 1,000 parts by weight of a curing agent for epoxy resins may be further added, if necessary, to a composition of 100 parts by weight of an epoxy resin and 10–2,000 parts by weight of a maleinated asphaltic material or its ester. The further addition of the curing agent for epoxy resins may not be necessary. But, if necessary, it is effected depending on the heating conditions for reacting the epoxy resin with the maleinated asphaltic material or its ester, or depending on properties required in the composition to be produced. The more preferable amount of the curing agent used is, by weight, 0.1–300 parts per 100 parts of the epoxy resin used. The curing agents for epoxy resins to be used in this invention are generally known curing agents hitherto used on epoxy resins, such as aliphatic polyamines, aromatic polyamines, primary, sec.- and tert.-amines, maleic anhydride, phthalic anhydride or other acid anhydride, polyamide resins, polysulfide resins, boron trifluoride-amine complex and synthetic resin precondensates like phenol resins. These curing agents are described in the previously mentioned Annex 9 "Epoxy resin" published in June 1973.

As mentioned above, this invention makes it possible to improve the compatibility of asphaltic materials with epoxy resins by reforming the former and to provide compositions from which are obtained cured products having sufficient hardness and flexibility as well as excellent adhesiveness, solvent resistance, heat resistance and wear resistance, the cured products being prepared by mixing and reacting the improved asphaltic material with the epoxy resin.

In practical applications the novel composition of the present invention has many specific advantages. For example, it will exhibit a good adhesiveness to aggregate, cement, asphalt, wood and metals. When the composition is used as a coating material, the surface of the resulting coating will be resistant to such solvents as gasoline and jet fuels. When exposed to a high temperature, the cured composition will be less liable to soften and run out than the hitherto known compositions in cured state. The composition of this invention is, therefore, suitable for use, for example, in road pavement, bridge surface pavement, heavy traffic road pavement, road pavement in a frigid region and non-skid pavement as well as pavement of airfields, wharfs, warehouse floors, sidewalks, tennis courts and ship decks; it is also useful as a coating material.

This invention will be better understood by the following Examples and Comparative examples wherein all parts are by weight unless otherwise specified.

There were produced asphalt compositions having the formulation shown in the following Table 1. The compositions so produced were then evaluated for their properties. The epoxy resins, asphaltic materials and curing agents for epoxy resins used in the compositions are listed below.

Epoxy resin A: A reaction product of bisphenol A and epichlorohydrin, having an epoxy equivalent of 210 and a viscosity of 50,000 cps (centipoise) at 25° C.

Epoxy resin B: A reaction product of bisphenol A and epichlorohydrin, having an epoxy equivalent of 190 and a viscosity of 13,000 cps at 25° C.

Epoxy resin C: A reaction product of bisphenol A and β-methylepichlorohydrin, having an epoxy equivalent of 188 and a viscosity of 900 cps at 25° C.

Maleinated asphalt D: A reaction product, obtained by reacting 90% by weight of 150/200 straight asphalt (having a penetration of 190) with 10% by weight of maleic anhydride at 210° C. for 4 hours.

Maleinated asphalt E: A reaction product, obtained by reacting 95% by weight of 150/200 straight asphalt (having a penetration of 190) with 5% by weight of maleic anhydride at 185° C. for 4 hours.

Maleinated asphalt ester F: A reaction product, obtained by reacting 100 parts by weight of maleinated asphalt E with 2 parts by weight of benzyl alcohol at 200° C. for 5 hours.

Maleinated asphalt G: A reaction product, obtained by reacting 95% by weight of a bottom oil (viscosity: 467 cSt at 98.9° C.) obtained from the bottom of a distillation tower by the distillation of a crude oil therein under reduced pressure, with 5% by weight of maleic anhydride at 200° C. for 4 hours. The reaction product had a penetration of 310 (25° C., 100 g, 2 seconds).

Maleinated asphalt H: A reaction product having a penetration of 300 (25° C., 100 g, 2 seconds), obtained by reacting 90% by weight of a bottom oil (viscosity: 467 cSt at 98.9° C.) produced by the distillation of a crude oil, with 10% by weight of maleic anhydride at 205° C. for 4 hours.

Curing agent I: Maleic anhydride

Curing agent J: Dimethylbenzylamine

Curing agent K: Polyamide non-solvent type curing agent having an amino value of 315 and a viscosity of 2000 cps at 25° C.

EXAMPLES 1-3 AND COMPARATIVE EXAMPLES 1-3

An epoxy resin was thoroughly mixed with an asphaltic material at 130° C. The resulting two-component mixture was allowed to stand for curing at 130° C. for 5 hours, allowed to cool to room temperature and then tested for compatibility of one component with the other. It was found that the compositions of Examples 1, 2 and 3 wherein the maleinated asphalt D was used as the asphaltic material were homogeneous ones because of satisfactory compatibility of the asphaltic material with each of the epoxy resins A, B and C. On the other hand, it was also found that the compositions of Comparative examples 1, 2 and 3 wherein 80/100 straight asphalt was used were each separated into two layers because of poor compatibility of the asphaltic material with each of the epoxy resins A, B and C.

Table 1

|  |  | Asphalt composition (parts by weight) | | | Compatibility |
|---|---|---|---|---|---|
|  |  | Epoxy resin | Asphaltic material | | |
| Example | 1 | A (100) | Maleinated asphalt D | (100) | Satisfactory |
| " | 2 | B (100) | " | (100) | " |
| " | 3 | C (100) | " | (100) | " |
| Comparative example | 1 | A (100) | 80/100 Straight asphalt | (100) | Poor |
| " | 2 | B (100) | " | (100) | " |
| " | 3 | C (100) | " | (100) | " |

EXAMPLES 4-5

The composition of Example 4 comprising the epoxy resin B and the maleinated asphalt D had a penetration of 106 and, after heated to 130° C. for 12 hours, it was converted to a composition having a penetration of 35. The composition of Example 5 comprising the epoxy resin B, the maleinated asphalt and the curing agent I had a penetration of 115, and it was converted to an asphalt composition having a penetration of 17 by heating the former to 140° C. for two hours. From this result it was found that the curing was accelerated by heating and that the curing was further accelerated by heating in the presence of the curing agent added thereby shortening the reaction time.

EXAMPLE 6

The composition of Example 6 comprising the epoxy resin B and the maleinated asphalt ester F was blended together at 130° C. for 5 minutes and then allowed to stand at 130° C. for 48 hours for the curing thereof, thereby obtaining a uniform or homogeneous asphalt composition having a penetration of 29.

COMPARATIVE EXAMPLES 4-6

The maleinated asphalts D, E and the maleinated asphalt ester F had a penetration of 75-95 and were unsatisfactory in hardness as compared with the compositions obtained in Examples 4-6.

COMPARATIVE EXAMPLE 7

Fifteen (15) parts by weight of styrene-butadiene rubber (average molecular weight of 200,000) and 100 parts by weight of 80/100 straight asphalt were heated to 160° C. for two hours, incorporated with 1.5 parts by weight of maleic anhydride and heated to 170°–180° C. under agitation for two hours. The resulting reaction product had a penetration of 53 and was unsatisfactory in hardness as compared with the compositions obtained in Examples 4–6.

From the above results it is apparent that the asphalt compositions of the present invention have satisfactory strength and flexibility.

What is claimed is:

1. As asphalt composition comprising (A) 100 parts by weight of an epoxy resin and (B) 10–2,000 parts by Table 2

| | | Asphalt composition (parts by weight) | | | | |
|---|---|---|---|---|---|---|
| | | Resin or polymer | | Asphaltic material | Curing agent for epoxy resin | Penetration |
| Example | 4 | Epoxy resin B | (100) | Maleinated asphalt D (230) | — | 35 |
| " | 5 | " | (100) | Maleinated asphalt E (300) | I (4) | 17 |
| " | 6 | " | (100) | Maleinated asphalt ester F (300) | J (4) | 29 |
| Comparative example | 4 | — | | Maleinated asphalt D | — | 75 |
| " | 5 | — | | Maleinated asphalt E | — | 95 |
| " | 6 | — | | Maleinated asphalt ester F | — | 95 |
| Comparative example | 7 | Reaction product obtaind by heating S-B rubber (15) and 80/100 straight asphalt (100) and then maleinating the resulting mixture with maleic anhydride (15). | | | — | 53 |

EXAMPLES 7–8

The composition of Example 7 comprised the epoxy resin B, maleinated asphalt G and curing agent J, and the composition of Example 8 comprised the epoxy resin B, maleinated asphalt H and curing agent J. These compositions were tested for tensile strength in order to study the strength and flexibility thereof. The tests were carried out as follows.

These compositions were each agitated at 60° C. for two minutes, poured into a stainless steel dish in such an amount as to form a 4 mm thick layer therein and then heated to 130° C. for 3 hours for curing. Test pieces, 10 mm wide and 4 mm thick, were prepared from the layers so cured in accordance with the No. 2 type test pieces prescribed in JIS (Japanese Industrial Standard) K 7113-1971 and they were tested at 25° C. and 20 mm/min. for tensile strength and elongation in accordance with JIS K 7113-1971. The results are shown in the following Table 3.

COMPARATIVE EXAMPLE 8

A mixture of epoxy resin C, 80/100 straight asphalt and curing agent J as shown in Table 3 was heated to 60° C. under agitation for 30 minutes, but it yielded an unhomogeneous composition. The composition so yielded was tested in the same manner as in Examples 7–8 with the results being shown in Table 3.

weight of a maleinated asphaltic material obtained by reacting an asphaltic material with maleic anhydride in the ratio by weight of 100:0.2 to 100 at a temperature of 100° to 300° C. and a pressure of atmospheric to 30 kg/cm$^2$.

2. An asphalt composition according to claim 1, further comprising (C) up to 1,000 parts by weight of a curing agent for the epoxy resin.

3. An asphalt composition comprising (A) 100 parts by weight of an epoxy resin and (B) 10–1,000 parts by weight of an esterified, maleinated asphaltic material.

4. An asphalt composition according to claim 3, further comprising (C) up to 1,000 parts by weight of a curing agent for the epoxy resin.

5. An asphalt composition according to claim 3, wherein the esterified, maleinated asphaltic material (B) is a member selected from the group consisting of (1) a reaction product of an asphaltic material and an esterified maleic anhydride and (2) an ester of an alcohol and a reaction product of an asphaltic material and maleic anhydride.

6. An asphalt composition according to claim 4, wherein the esterified, maleinated asphaltic material (B) is a member selected from the group consisting of (1) a reaction product of an asphaltic material and an esterified maleic anhydride and (2) an ester of an alcohol and a reaction product of an asphaltic material and maleic anhydride.

* * * * *

Table 3

| | | Asphalt composition (parts by weight) | | | | Maximum tensile strength (kg/cm$^2$) | Elongation (%) |
|---|---|---|---|---|---|---|---|
| | | Resin | | Asphaltic material | Curing agent for epoxy resin | | |
| Example | 7 | Epoxy resin | C (100) | Maleinated asphalt G (1580) | K (75) | 2.1 | 60 |
| Example | 8 | " | C (100) | Maleinated asphalt H (1580) | K (75) | 3.4 | 25 |
| Comparative example | 8 | " | C (100) | 80/100 Straight asphalt (1600) | J (4) | 1.3 | 20 |